(12) United States Patent
Schönenberger

(10) Patent No.: US 6,786,323 B2
(45) Date of Patent: Sep. 7, 2004

(54) SUSPENDED CONVEYER DEVICE COMPRISING A RE-ROUTING STATION

(75) Inventor: Rolf Schönenberger, Landsberg/Lech (DE)

(73) Assignee: WF Logistik GmbH, Landsberg (DE)

( * ) Notice: Subject to any disclaimer, the term of this patent is extended or adjusted under 35 U.S.C. 154(b) by 128 days.

(21) Appl. No.: 10/220,301

(22) PCT Filed: Mar. 14, 2001

(86) PCT No.: PCT/EP01/02876
§ 371 (c)(1),
(2), (4) Date: Sep. 12, 2002

(87) PCT Pub. No.: WO01/68482
PCT Pub. Date: Sep. 20, 2001

(65) Prior Publication Data
US 2004/0045793 A1 Mar. 11, 2004

(30) Foreign Application Priority Data
Mar. 15, 2000 (DE) .......................... 100 12 524

(51) Int. Cl.⁷ .............................................. B65G 17/20
(52) U.S. Cl. ...................... 198/678.1; 198/681; 198/682
(58) Field of Search ............................... 198/678.1, 358, 198/570, 681, 682

(56) References Cited
U.S. PATENT DOCUMENTS

| | | |
|---|---|---|
| 2,092,396 | * 9/1937 | Jennings .................. 198/678.1 |
| 3,747,538 | 7/1973 | Giraud |
| 3,853,068 | 12/1974 | Avery |
| 5,361,890 | * 11/1994 | McDonald et al. ...... 198/465.4 |
| 5,404,992 | * 4/1995 | Robu et al. .............. 198/465.4 |
| 5,697,301 | 12/1997 | Sporer |
| 5,718,320 | * 2/1998 | Marquier et al. ......... 198/345.3 |
| 6,341,686 | * 1/2002 | Beyer .......................... 198/680 |

FOREIGN PATENT DOCUMENTS

| | | |
|---|---|---|
| DE | 173050 | 7/1906 |
| DE | 922819 | 1/1955 |
| DE | 9402990 | 6/1995 |
| DE | 19800630 | 7/1999 |

* cited by examiner

Primary Examiner—Richard Ridley
(74) Attorney, Agent, or Firm—Rothwell, Figg, Ernst & Manbeck, P.C.

(57) ABSTRACT

The invention relates to a suspended conveyer device for conveying supports (7) for goods to be conveyed along conveyer paths (54, 58), comprising a running rail arrangement with running rails (52, 56) which are associated with the conveyer paths and on which the supports (7) for goods to be conveyed can be guided. According to the invention, a rerouting station (50) is provided which is constructed to selectively reroute supports (7) for goods to be conveyed from a first conveyer path (54) to a second conveyer path (58) or to leave them on the first conveyer path (54), and to selectively reroute supports (7) for goods to be conveyed from the second conveyer path (58) to the first conveyer path (54) or to leave them on the second conveyer path (58). The invention also relates to a rerouting station of this type.

25 Claims, 9 Drawing Sheets

SUSPENDED CONVEYER DEVICE COMPRISING A RE-ROUTING STATION

The invention relates to a suspended conveyer device for conveying supports for goods to be conveyed along conveyer paths, comprising a running rail arrangement with running rails which are associated with the conveyer paths and on which the supports for goods to be conveyed can be guided.

In this case, the primary thought is given to a suspended conveyer device for conveying supports for goods to be conveyed which in each case comprise a supporting element having two running rollers, projecting from the supporting element on opposite sides, to roll on running rails associated with the conveyer paths, running rails being assigned to the conveyer paths and having a running roller guide groove which is open at the top to guide supports for goods to be conveyed which, in each case, as based on the conveying direction, are suspended by a left or right running roller on the running rail, engage with this running roller in the guide groove, and, with the supporting element, extend downward into a conveyer path clearance laterally beside the running rail.

Suspended conveyer devices of the type mentioned above find widespread use, for example in the clothing industry, and are predominantly used there to transport articles of clothing suspended on clothes hangers. In this case, the supports for goods to be conveyed which are used are hanger supports, as they are known, having a supporting element which, at its lower end, has a hook area for the suspension of a clothes hanger and, at its upper end, has a pair of running rollers that project from the supporting element from opposite sides. The hanger supports are generally in each case suspended by one running roller on a running rail, it being possible for this running roller to roll in a guided manner in a guide groove of the running rail during conveying operation. The supporting element of the hanger support extends laterally downward beside the running rail into a conveyer path clearance. In order to drive the hanger supports, a drive belt or the like guided along the running rail is usually provided. In the case of a frictional belt drive, the drive belt is a frictional belt which, for example, as an endless belt, is driven in circulation around two deflection stations and which can drive hanger supports along the respective running rail by friction. Suspended conveyer devices having such frictional belt drives normally enable optional backup of a number of supports for goods to be conveyed as the frictional belt continues to run. Such a suspended conveyer device with frictional belt drive is described, for example, in EP 0 582 047 B1.

Suspended conveyer devices are also known in which the hanger supports are driven to move by means of a conveyer chain which is driven in circulation around two deflection stations and is guided along relevant running rails.

In the case of the suspended conveyer devices mentioned above, a coherent running rail stream section (a coherent running rail path) normally runs from one deflection station of the relevant drive belt to the next deflection station. The transfer of hanger supports from one conveyer path section to another conveyer path section, or the removal of hanger supports from the respective conveyer path in the case of the known suspended conveyer devices, is carried out at the deflection stations by means of appropriate hanger support transfer devices on rotating deflection drums belonging to the deflection stations. With reference to the prior art, reference is again made in this regard to EP 0 582 047 B1.

German patent application 199 43 141 (filing date 09.09.1999) from the applicant describes a branching station or diverter for a suspended conveyer device of the type explained above, which permits the selective removal of supports for goods to be conveyed from a running rail stream section of a first conveyer path, in order to supply the removed supports for goods to be conveyed to a second conveyer path. The branching station therefore provides the possibility of selectively removing supports for goods to be conveyed from a first conveyer path and supplying them to a second conveyer path, that is to say—expressed in another way—selectively rerouting the supports for goods to be conveyed from the first conveyer path to a second conveyer path or leaving them on the first conveyer path. The branching station is not functionally bound to a deflection station for drive belts, but can also be connected to an approximately rectilinear course of the first conveyer path. In addition to supplying the supports for goods to be conveyed to the diverter or branching station in such a conveying direction such that the diverter or branching station can be used selectively for rerouting, the laid-open specification also considers supplying the supports for goods to be conveyed to the diverter in conveying directions opposed thereto.

Furthermore, EP 0 926 083 A1 discloses a crossover for a suspended conveyer which permits a first and a second conveyer path to cross. Removal of the supports for goods to be conveyed from the first or second conveyer path and supplying the removed supports for goods to be conveyed to the other conveyer path is not possible in the case of the known crossover.

The object of the invention is to provide a possible way of transferring supports for goods to be conveyed between a first conveyer path and a second conveyer path, which provides high flexibility with regard to the guidance of streams of goods in the suspended conveyer device. In order to achieve this object, the invention proposes that the suspended conveyer device has a rerouting station, which is constructed to selectively reroute supports for goods to be conveyed from a first conveyer path to a second conveyer path or to leave them on the first conveyer path, and to selectively reroute supports for goods to be conveyed from the second conveyer path to the first conveyer path or to leave them on the second conveyer path.

According to the invention, the rerouting station, which can also be referred to, if appropriate as a crossover diverter or X-diverter, permits both selective removal of supports for goods to be conveyed from the first conveyer path and the supply (the insertion) of the supports for goods to be conveyed to the second conveyer path (rerouting from the first conveyer path to the second conveyer path) and also the removal of supports for goods to be conveyed from the second conveyer path and the supply (the insertion) of the removed supports for goods to be conveyed to the first conveyer path (rerouting of the supports for goods to be conveyed from the second conveyer path to the first conveyer path). The following streams of goods are therefore possible: supports for goods to be conveyed supplied on the first conveyer path are rerouted to the second conveyer path, supports for goods to be conveyed supplied on the first conveyer path remain on the first conveyer path, supports for goods to be conveyed supplied on the second conveyer path are rerouted to the first conveyer path, supports for goods to be conveyed supplied on the second conveyer path remain on the second conveyer path.

By appropriate use of the rerouting station, it is, moreover, possible to combine, in the rerouting station, a first stream of goods supplied to the rerouting station on the first conveyer path by using supports for goods to be conveyed, and a second stream of goods supplied to the rerouting station on the second conveyer path by using supports for goods to be conveyed and, if appropriate, to mix said streams, and to carry the resultant stream of goods away from the rerouting station on the first or the second conveyer path. Furthermore, by appropriate use of the rerouting station, it is possible to distribute goods, which are supplied to the rerouting station by using supports for goods to be conveyed via the first conveyer path and/or via the second conveyer path, to two resultant streams of goods, by the goods supplied being selectively allocated in the rerouting station to the first or the second conveyer path for further conveyance and, accordingly, carried away from the rerouting station via the first conveyer path or via the second conveyer path. In this way, for example, sorting tasks can be solved in a straightforward manner.

The examples mentioned make it clear that the rerouting station according to the invention can advantageously be used for an extremely wide range of combining, mixing, distributing and sorting tasks in relation to objects or goods that can be transported by means of supports for goods to be conveyed and, accordingly, provides through great flexibility in the handling of supports for goods to be conveyed or the objects transported thereby. In this connection, it can also be extremely advantageous furthermore that, in the various applications of the rerouting station, at least in the regular case, the supports for goods to be conveyed can maintain their conveying direction, that is to say a reversal of the conveying direction is not required.

Mention should further be made of the fact that the above text refers to a first conveyer path and a second conveyer path on which in each case firstly supports for goods to be conveyed can be supplied to the rerouting station and secondly the supplied supports for goods to be conveyed can be carried away from the rerouting station again. It is therefore assumed that the first and the second conveyer path lead through the rerouting station, the rerouting station selectively rerouting supports for goods to be conveyed between the first and the second conveyer path. However, it is also readily possible to speak of a first, a second, a third and a fourth conveyer path of which two conveyer paths are used to supply supports for goods to be conveyed to the rerouting station and the other two conveyer paths are used to carry the supports for goods to be conveyed supplied to the rerouting station away from the rerouting station. The rerouting station could then be characterized, for example, in that it is designed to selectively reroute supports for goods to be conveyed from a first conveyer path, ending in the rerouting station, to a third conveyer path, beginning in the rerouting station, or to a fourth conveyer path, beginning in the rerouting station, and to selectively reroute supports for goods to be conveyed from a second conveyer path ending in the rerouting station, to the third or the fourth conveyer path. In the following text, however, the nomenclature used first will be used, according to which a first and a second conveyer path are provided, in each case leading through the rerouting station, it being possible for the supports for goods to be conveyed to be selectively rerouted between the first and the second conveyer path or left on the respective conveyer path. The assignment of the conveyer path sections leading to the rerouting station and the conveyer path sections leading away from the rerouting station to the first and to the second conveyer path, respectively, is in principle arbitrary.

An expedient assignment may often be derived from the configuration of the suspended conveyer device, for example the guidance of a drive belt or the like.

Mention has already been made of the possibility that the conveyer paths are in each case assigned at least one running rail which has a running roller guide groove which is open at the top to guide supports for goods to be conveyed which, in each case, as based on the conveying direction, are suspended by a left or right running roller on the running rail, engage with this running roller in the guide groove and, with the supporting element, extend downward into a conveyer path clearance laterally beside the running rail. In this case it may be that, of the first and the second conveyer path, one, at least in some areas (but in any case in a path area located upstream of the rerouting station in the conveying direction and in a path area located downstream of the rerouting station in the conveying direction), is provided to guide supports for goods to be conveyed suspended on a relevant running rail by the left running rollers, and the other, at least in some areas (but in any case in a path area located upstream of the rerouting station in the conveying direction and in a path area located downstream of the rerouting station in the conveying direction) is provided to guide supports for goods to be conveyed suspended on a relevant running rail by the right running rollers. A rerouting station which is suitable for such an application situation (according to an expedient assignment of the conveyer path sections leading to the rerouting station and leading away from the rerouting station to the first and to the second conveyer path) is distinguished by the fact that rerouting between the first and the second conveyer path provides for a change from suspension of the supports for goods to be conveyed by the left running rollers on a relevant running rail to suspension of the supports for goods to be conveyed by the right running rollers on a relevant running rail or, respectively, a change from suspension of the supports for goods to be conveyed by the right running rollers on a relevant running rail to suspension of the supports for goods to be conveyed by the left running rollers on a relevant running rail.

According to a preferred embodiment of the rerouting station the first conveyer path and the second conveyer path in the rerouting station run over a decision path which is common to these conveyer paths or a decision location which is common to these conveyer paths, it being possible for the supports for goods to be conveyed as they pass the decision path or the decision location to be allocated selectively to the first or the second conveyer path for further conveyance.

In the rerouting station, in the area of the decision location or within the decision path, the supports for goods to be conveyed may be in actual or potential guiding engagement and, if appropriate, supporting and running-roller rolling engagement both with a first running rail path of the first conveyer path and with a second running rail path of the second conveyer path, wherein, of the first and the second running rail path, one is a running rail path associated with left running rollers and the other is a running rail path associated with right running rollers.

If a running rail path is mentioned here, this means an area or section of a running rail or of a plurality of running rails following one another in the conveying direction along the respective conveyer path (if appropriate, the entire running rail or the running rail stream section formed by the running rails), it being possible for the respective running rail to be formed in one or more parts, that is to say for example by a single-part running rail component or a supporting profile component and a running rail component mounted thereon. If mention is made here of potential guiding engagement as opposed to actual guiding engagement, this means that the two running rail paths in the rerouting station can, if appropriate, also fulfill only the function of a drop-off safeguard or the like if the guidance of the supports for goods to be conveyed is carried out, for example, by means of a drive arrangement that holds the individual supports for goods to be conveyed. As a rule, however, actual guiding engagement will be provided, this preferably being direct engagement between the supports for goods to be conveyed and the running rail paths. However, there is also the possibility that the guiding engagement is brought about by using for instance the drive arrangement already mentioned which, for example, comprises elongate driver elements, for example driver chains, guided in the running rail paths.

In order to permit rerouting between the conveyer paths without great mechanical outlay and without excessive rerouting forces, it is preferred that in the rerouting station, in the area of the decision location or within the decision path, in the case of a left running roller, between the latter and the associated running rail path there is provided no substantial guiding engagement or only such engagement which is reduced as compared with other running rail paths, acting laterally to the right, and in the case of a right running roller, between the latter and the associated running rail path there is provided no substantial guiding engagement or only such engagement which is reduced as compared with other running rail paths, acting laterally to the left. According to a preferred configuration, this is achieved in that a rail section which bounds a guide groove laterally toward the conveyer path clearance and belongs to the first running rail path, and a rail section which bounds a guide groove laterally toward the conveyer path clearance and belongs to the second running rail path in each case have a cutout which is open laterally to the left and right, respectively in the area of the decision location or within the decision path.

As a particularly preferred possible configuration of the rerouting station, it is proposed that the first running rail path and the second running rail path run toward each other in a curve in the direction of the decision path or the decision location and, in the area of the decision path or the decision location, have a lateral spacing which leaves a common conveyer path clearance free. Such guidance of the conveyer paths is expedient in particular when the first and the second conveyer path run parallel to each other in some areas.

In order to reroute the supports for goods to be conveyed between the first and the second conveyer path, the rerouting station can comprise at least one guide element for supports for goods to be conveyed which can be adjusted between a first and a second guide position and which, in the first guide position, has an adjustable guide element for supports for goods to be conveyed which, in the guide position, leaves supports for goods to be conveyed supplied on the first conveyer path on the latter and reroutes supports for goods to be conveyed supplied on the second conveyer path to the first conveyer path and which, in the second guide position, leaves supports for goods to be conveyed supplied on the second conveyer path on the latter and reroutes supports for goods to be conveyed supplied on the first conveyer path to the second conveyer path.

The guide element, which can be arranged above the decision location or the decision path, for example, preferably has at least one run-on inclined surface, onto which a respective positive guidance section preferably formed by an upper end section of the supporting element and belonging to the supports for goods to be conveyed runs and which guides the supports for goods to be conveyed positively in such a way that the respective support for goods to be conveyed is conveyed onward along a specific conveyer path downstream of the decision point or the decision path, along the first conveyer path in the case of the first guide position and along the second conveyer path in the case of the second guide position.

With regard to the configuration of the guide element, there are in principle many possibilities. For example, the guide element can have a body with a guide channel which is bounded laterally by run-on inclined surfaces and which comprises a receiving section which, both in the first and in the second guide position, receives supports for goods to be conveyed supplied both along the first and along the second conveyer path, and a discharge section which, in the first guide position, allocates the supports for goods to be conveyed in a defined way to the first conveyer path and, in the second guide position, allocates the supports for goods to be conveyed in a defined way to the second conveyer path and has a lateral width which is lower than the receiving section. In this case, it can be advantageous if at least the receiving section of the guide channel, preferably the entire guide channel, increasingly narrows laterally in the conveying direction. For example, the receiving section or the guide channel could narrow in the manner of a funnel.

It has already been indicated that a drive arrangement can be provided which comprises at least one elongate first driver element, if appropriate a first driver chain, which is associated with the first conveyer path and conveys the supports for goods to be conveyed through the rerouting station, and at least one elongate second driver element, if appropriate a second driver chain, which is associated with the second conveyer path and conveys the supports for goods to be conveyed through the rerouting station.

Primarily, when the rerouting station is constructed with a decision path which is common to the first and the second conveyer path or a decision location which is common to these conveyer paths, it is expedient for the supports for goods to be conveyed in the rerouting station, at least in some areas, to be in driving engagement both with the first driver element and with the second driver element, it being expedient in the case of the aforementioned construction of the rerouting station with a common decision path or common decision location for the supports for goods to be conveyed in each case to be in driving engagement with both driver elements, at least within the decision path or in the area of the decision location.

The drive arrangement can be a drive arrangement which ensures that the supports for goods to be conveyed are conveyed in other path sections of the first and second conveyer path as well, that is to say for example also upstream and downstream of the rerouting station. However, the aforementioned drive arrangement can also be a drive arrangement specifically associated with the rerouting station.

According to a preferred embodiment, the suspended conveyer device comprises a main drive arrangement assigned to the first and the second conveyer path, and an additional drive arrangement assigned to the rerouting station. The main drive arrangement can comprise at least one elongate first main driver element, if appropriate a first frictional belt, that drives supports for goods to be conveyed along the first conveyer path, and at least one elongate second main driver element, if appropriate a second frictional belt, which drives supports for goods to be conveyed along the second conveyer path. The additional drive arrangement can comprise at least one elongate first additional driver element, if appropriate a first driver chain, which is assigned to the first conveyer path and conveys the supports for goods to be conveyed through the rerouting station, and at least one elongate second additional driver element, if appropriate a second driver chain, which is assigned to the second conveyer path and conveys the supports for goods to be conveyed through the rerouting station.

It is pointed out that, in principle, it is possible to guide a single driver element along a plurality of conveyer paths for the purpose of driving the supports for goods to be conveyed. For this reason, the term "elongate driver element" used here is also intended to comprise the meaning "driver element section".

The main drive arrangement is preferably designed to permit supports for goods to be conveyed to back up when the drive of the main driver elements is running (that is to say the driver elements are running). The additional drive arrangement is preferably designed to ensure defined passage times for the supports for goods to be conveyed to pass through the rerouting station, it being possible, to achieve the defined passage times, if appropriate to dispense with permitting the supports for goods to be conveyed to back up when the driver element is running, the additional drive arrangement therefore not necessarily being capable of allowing a backup, as opposed to the preferred design of the main drive arrangement.

In order to couple the supports for goods to be conveyed to the additional driver elements, the additional driver elements can carry engagement elements which, preferably above the running rollers, act with a form fit or force fit on the supports for goods to be conveyed and produce a form-fitting or force-fitting driving engagement. The engagement elements can engage in engagement cutouts in the supports for goods to be conveyed, producing the driving engagement. In the case of the force-fitting driving engagement, the latter is preferably based on resilient reaction forces of the engagement elements deformed resiliently in the course of the production of the driving engagement or the driving engagement is at least reinforced by the resilient reaction forces.

Depending on the design of the main drive arrangement, it may be expedient for the main driver elements to be guided past the rerouting station, for example in order to avoid problems with regard to the guidance of the frictional belts in the case of frictional belts and/or to reduce frictional forces between the frictional belts and elongated of respective frictional belt guide to be overcome in order to drive the frictional belts. In this connection, it is extremely expedient, if, in an inlet area of the rerouting station, a transfer station (possibly comprising a separate first transfer station associated with the first conveyer path and a separate second transfer station associated with the second conveyer path) is provided, in which the driving engagement between the supports for goods to be conveyed and the respective main driver element is canceled and the driving engagement between the supports for goods to be conveyed and the respective additional driver element is produced. Furthermore, in this connection, it is extremely expedient if, in an outlet area of the rerouting station, a further transfer station (possibly comprising a separate first transfer station associated with the first conveyer path and a separate second transfer station associated with the second conveyer path) is provided, in which the driving engagement between the supports for goods to be conveyed and the respective additional driver element is canceled and the driving engagement between the supports for goods to be conveyed and the respective main driver element is produced.

It will regularly be expedient, in an inlet area of the rerouting station, to provide a passage barrier associated with the first conveyer path and/or a passage barrier associated with the second conveyer path, for the selective barring and releasing of the passage through the rerouting station for the supports for goods to be conveyed. The respective passage barrier preferably enables separation of the supports for goods to be conveyed, so that, for example, sorting tasks and goods separation tasks can be fulfilled by means of the rerouting station.

For many possible uses, for example, the aforementioned sorting tasks, it is extremely expedient if, in an inlet area or in the inlet area of the rerouting station, an identification arrangement for supports for goods to be conveyed, associated with the first conveyer path, if appropriate a barcode reading arrangement, and/or an identification arrangement for supports for goods to be conveyed, associated with the second conveyer path, if appropriate a barcode reading arrangement, is/are provided. In this connection, it is particularly expedient if the rerouting station can be actuated on the basis of identifications of supports for goods to be conveyed by means of the identification arrangement for supports for goods to be conveyed or identification arrangements for supports for goods to be conveyed. Actuation of the rerouting station can comprise actuation of the passage barrier or of the passage barriers and/or actuation of the guide element for supports for goods to be conveyed.

For high operational reliability, it is often expedient, at least in the area of the rerouting station, to provide a drop-off safeguard, which prevents the supports for goods to be conveyed dropping off a relevant running rail path. This is because, depending on the design of the running rail path, under certain circumstances there could be the risk of the supports for goods to be conveyed dropping off the running rail path, for example under the action of centrifugal forces and/or in the course of the release and/or production of a driving engagement with an associated driver element. The drop-off safeguard can advantageously comprise at least one safety rail running along the running rail path at a defined distance from the latter.

The invention relates further to a rerouting station for a suspended conveyer device as described above. According to the invention, the rerouting station is designed to selectively reroute supports for goods to be conveyed in a first conveyer path to a second conveyer path or to leave them on the first conveyer path, and to selectively reroute supports for goods to be conveyed from the second conveyer path to the first conveyer path or to leave them on the second conveyer path. In general terms, the rerouting station can be constructed in accordance with the rerouting station previously described and belonging to the suspended conveyer device according to the invention.

The invention relates further to a method of combining and, if appropriate, mixing at least two streams of goods by using a suspended conveyer device according to the invention or a rerouting station according to the invention. It is proposed that a first stream of goods be supplied to the rerouting station on a/the first conveyer path, and a second stream of goods be supplied to the rerouting station on a/the second conveyer path, the streams of goods be combined, and, if appropriate, mixed in the rerouting station, and the resultant stream of goods be carried away from the rerouting station on the first or the second conveyer path.

The invention relates further to a method of distributing the goods from at least one stream of goods to at least two resultant streams of goods, using a suspended conveyer device according to the invention or a rerouting station according to the invention. It is proposed that, on at least one conveyer path (a/the first conveyer path and/or a/the second conveyer path), at least one stream of goods be supplied to the rerouting station and, in the rerouting station, the goods be selectively allocated to the first or the second conveyer path for further conveyance and, accordingly, be carried away from the rerouting station on the first conveyer path as a first resultant stream of goods and on the second conveyer path as a second resultant stream of goods. The goods from at least two streams of goods are preferably distributed to at least two resultant streams of goods, a first stream of goods being supplied to the rerouting station on the first conveyer path, and a second stream of goods being supplied to the rerouting station on the second conveyer path.

The invention will be explained in more detail below using exemplary embodiments that are illustrated in the figures, in which.

Figure 1:
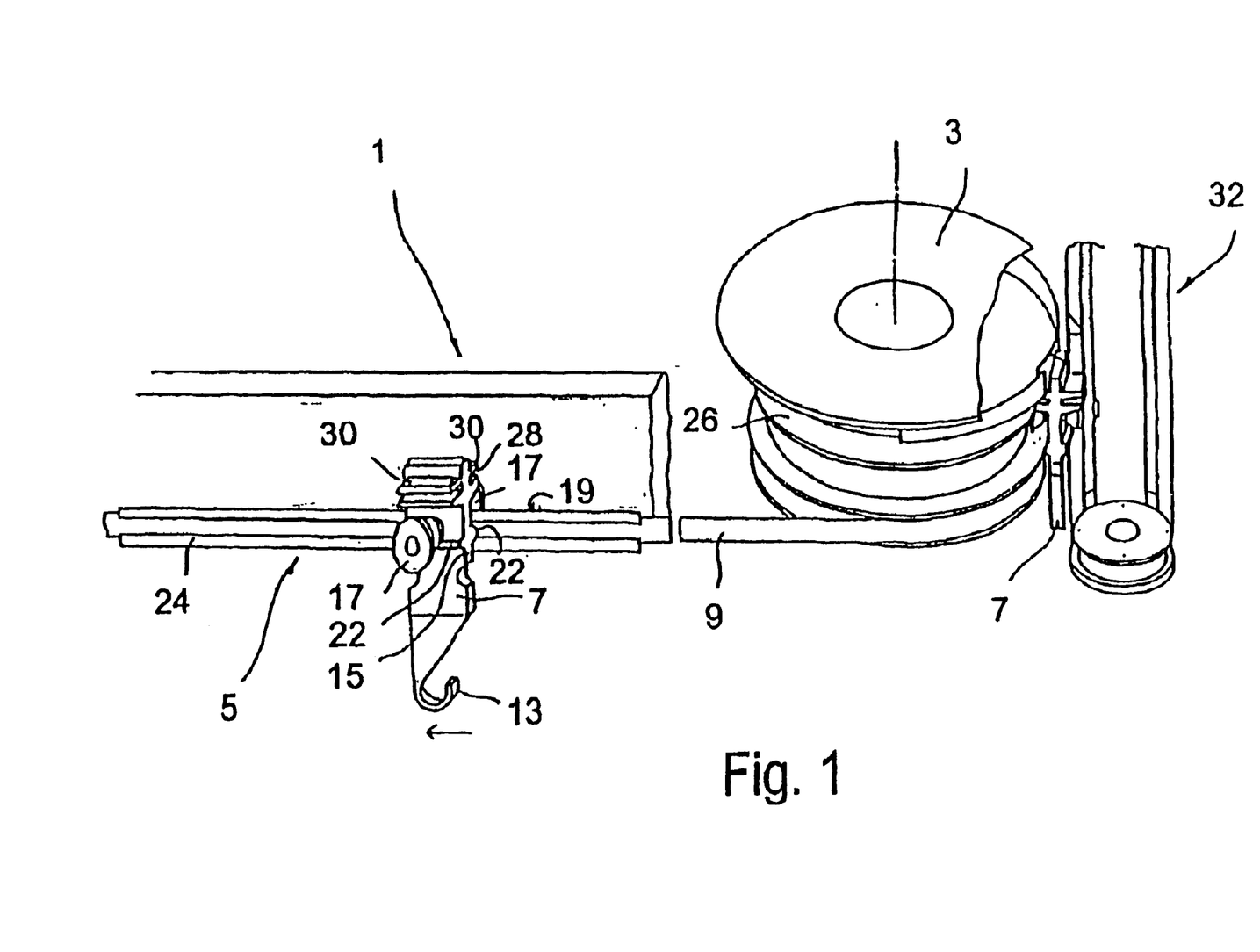
FIG. 1 shows a perspective illustration of a section, shown broken, of a running rail of a suspended conveyer device having a deflection station and having a support for goods to be conveyed guided in a manner suspended on one side on the running rail.

A rerouting station according to the invention can, for example, be integrated into a suspended conveyer device, as shown in an extract in FIG. 1. The suspended conveyer device shown in FIG. 1 is disclosed by EP 0 582 047 B1. It comprises a first conveying circuit 1 in the form of an elongate conveyer loop comprising deflection drums 3 and comprising running rails 5 in the rectilinear path areas between the deflection drums 3. Of the conveying circuit 1, FIG. 1 illustrates only the deflection drum 3 located on the right, in relation to the direction of view, and the running rail 5 located at the front, in relation to the direction of view. The conveying circuit 1 has a further deflection drum on the side opposite the deflection drum 3 on the left, and a further, corresponding running rail at the rear of the running rail 5.

The supports 7 for goods to be conveyed which have to be transported are, in the example, so-called hanger supports for the transport of articles of clothing suspended on clothes hangers. As can be seen in FIG. 1, the support 7 for goods to be conveyed has a hook 13 at its lower end. The hook of a clothes hanger can be hooked into this hook 13. The support for goods to be conveyed has a substantially vertically aligned supporting element 15 having two running rollers 17 projecting on the mutually opposite lateral sides of the supporting element 15. During the movement along a running rail 5, the support 7 for goods to be conveyed is in each case supported by a running roller 17 on a running surface of a guide groove 19 which is open at the top and belongs to the running rail 5, so that it is attached laterally to the running rail and guided in the longitudinal direction of the running rail 5. Underneath the running rollers 17, in each case a lateral protrusion with an outer frictional surface 22 is provided on the supporting element 15. In FIG. 1, one of the protrusions rests with its frictional surface 22 on the frictional belt 9, which is guided frictionally in the longitudinal direction of the running rail 5 by means of the guide 24, so that the frictional belt 9 carries along the support 7 for goods to be conveyed in order to move it along the running rail 5.

The running rail 5 illustrated in broken form in FIG. 1 is brought up with its right-hand end close to the deflection drum 3, so that the conveyer flange identified by 26 on the deflection drum 3 can engage in the lateral groove 28 of a support for goods to be conveyed that is directly approaching the deflection drum 3, in order to pick up the support 7 for goods to be conveyed from the running rail 5. Here, the support 7 for goods to be conveyed rests with a roof-like web 30 bounding the groove 28 at the top on the upper side of the conveyer flange 26. The support 7 for goods to be conveyed is then deflected in accordance with the rotation of the deflection drum 3. A curved rail not specifically explained here and arranged in a fixed location engages behind the upper end section of the support 7 for goods to be conveyed during the deflection movement, in order to secure the support for goods to be conveyed against slipping radially off the conveyer web 26. According to FIG. 1, a support 7 for goods to be conveyed picked up by the deflection drum 3 can be-transferred selectively to a second conveying circuit 32 which, in principle, can be constructed in the same way as the first conveying circuit 1.

In a suspended conveyer device of the type shown in FIG. 1, the present invention provides a possible way of transferring the support 7 for goods to be conveyed from one conveyer path to another conveyer path, without having to fall back on deflection drums 3 or the like for this purpose. Specifically, the invention provides the possibility of providing a transfer between conveyer paths running parallel to one another. For example, the rerouting station according to the invention, described in more detail below, can be integrated, for example, into the rectilinear area of the running rail 5 that is illustrated in FIG. 1, in order to remove supports 7 for goods to be conveyed from the running rail 5 as required and to supply said supports to a running rail running parallel thereto and belonging to another conveying circuit of the suspended conveyer device, that is to say to introduce the supports for goods to be conveyed onto this running rail of the other conveying circuit. It is expediently possible to speak of rerouting the supports for goods to be conveyed from one conveyer path to the other conveyer path, according to the invention (selective) rerouting in both directions being possible, that is to say from the first conveyer path to the second conveyer path or, conversely, from the second conveyer path to the first conveyer path.

Figure 2:
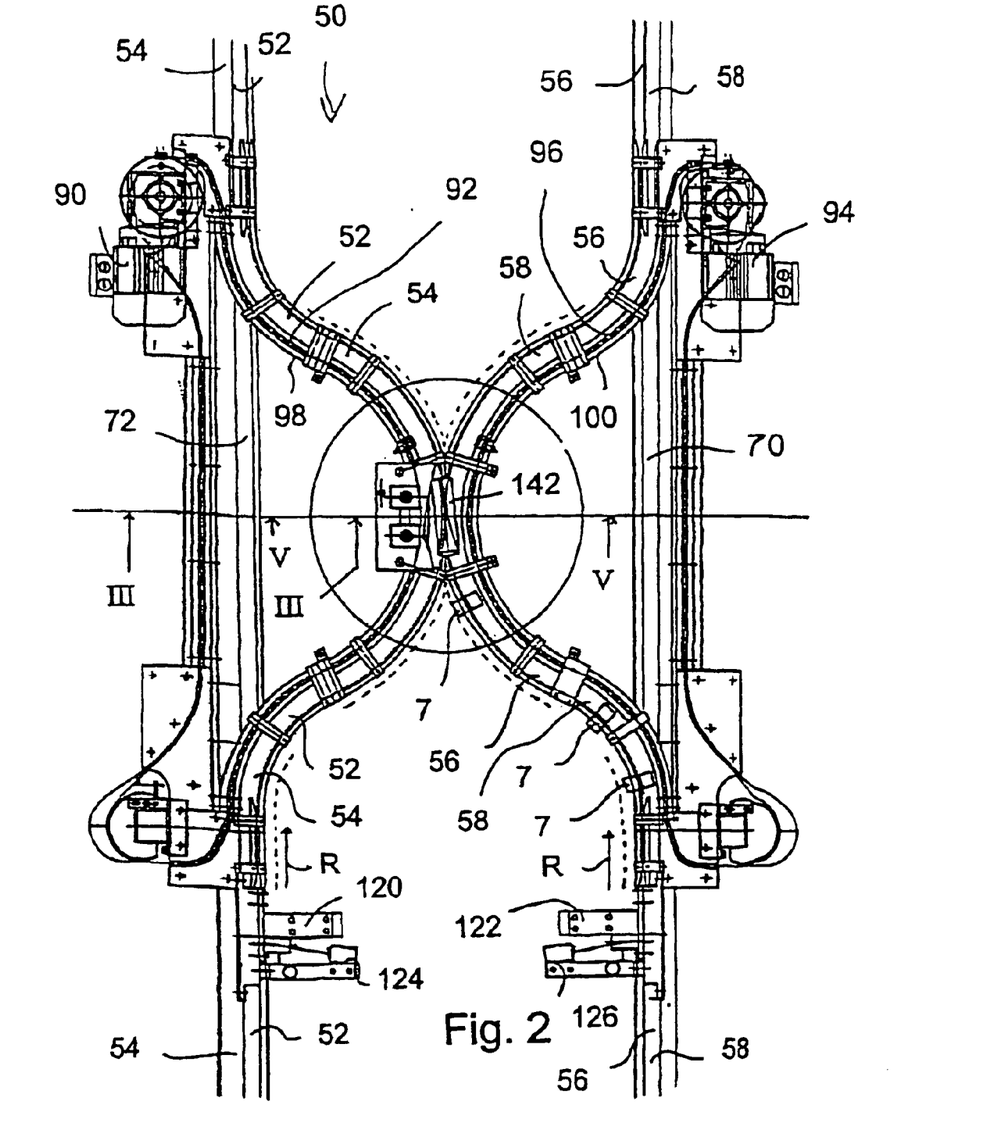
FIG. 2 shows a plan view (substantially corresponding to a section along line II—11 in FIG. 5) of an exemplary embodiment of a rerouting station according to the invention belonging to the suspended conveyer device, which permits supports for goods to be conveyed to be rerouted between a first conveyer path leading through the rerouting station and a second conveyer path leading through the rerouting station.
Figure 3:
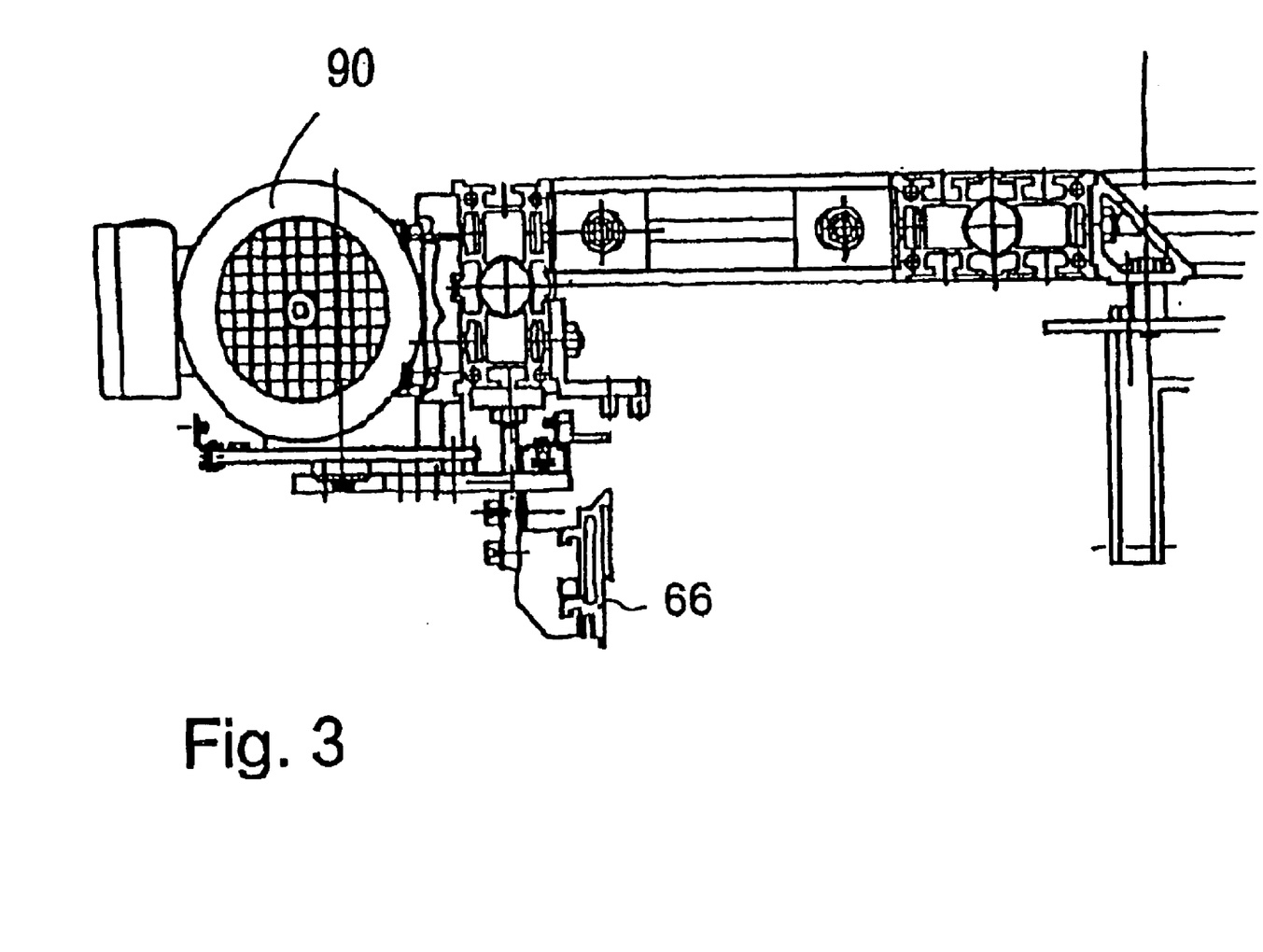
FIG. 3 shows a representation of the rerouting station, substantially corresponding to a partial section through the arrangement of FIG. 2 along line III—III in FIG. 2.
Figure 4:
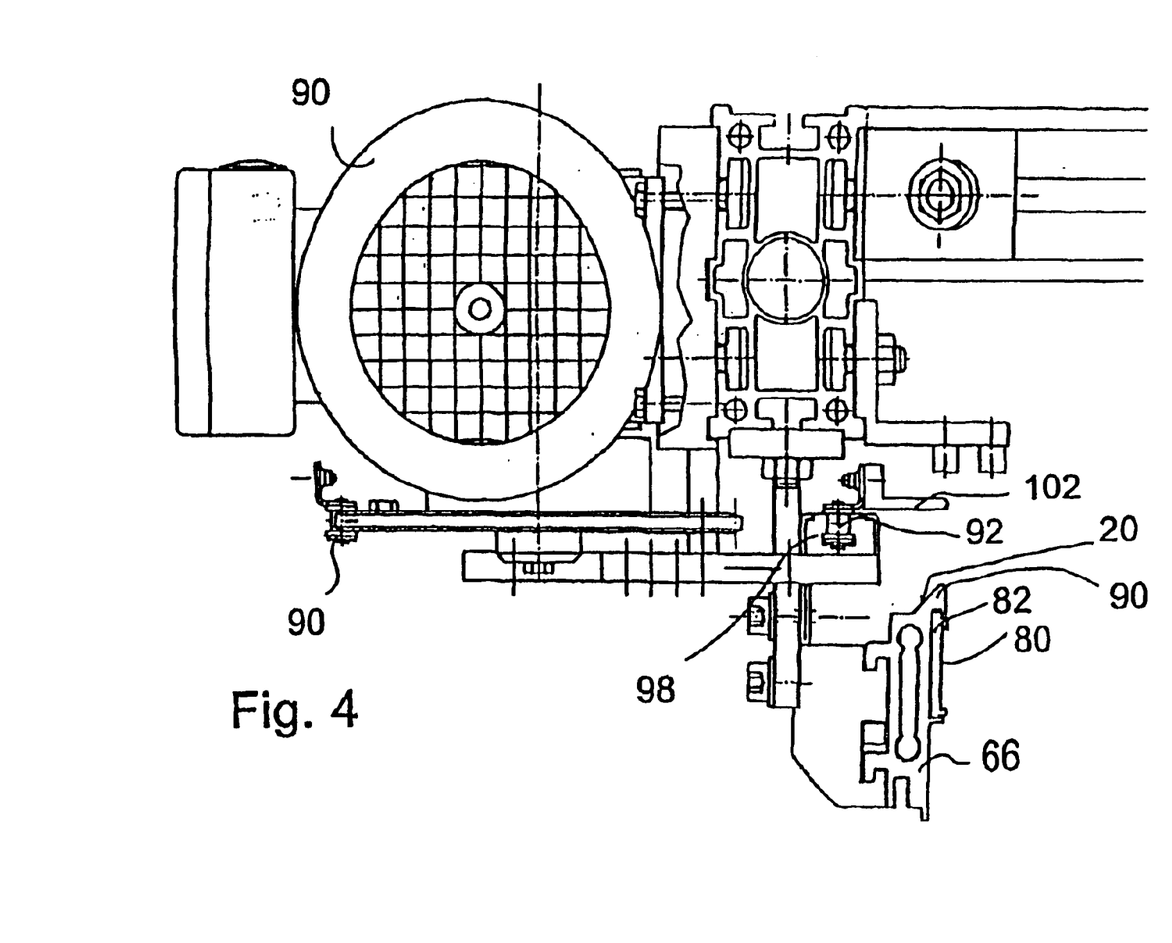
FIG. 4 shows a detailed enlargement of the representation of FIG. 3.

FIG. 2 is a plan view (corresponding to section II—II in FIG. 5) of an exemplary embodiment of a rerouting station 50 of this type. It is possible to see two running rail paths 52 and 56, which are used for the conveyance of supports 7 for goods to be conveyed and of which, for example, the running rail path 52 belongs to a first conveyer path 54 and the second running rail path 56 belongs to a second conveyer path 58. The two conveyer paths can, for example, belong to different conveying circuits, each comprising at least two deflection drums.

The running rail paths 52 and 56 first run parallel to each other in the conveying direction, then run toward each other in a curve in the area of the rerouting station 50, and then run away from each other again in a curve from a point of maximum lateral approach, until they change again into path sections of the running rail paths 52 and 56 which run parallel to one another.

Figure 9:
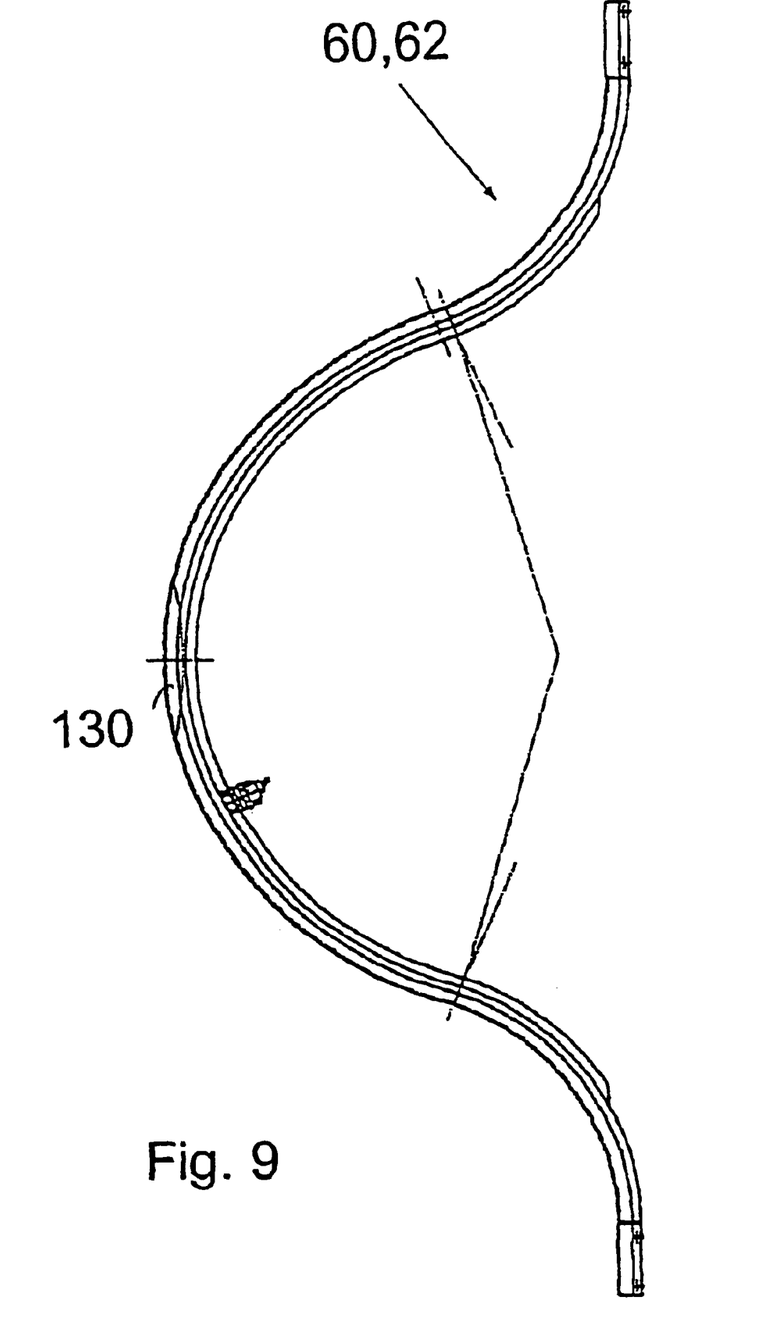
FIG. 9 shows a curved running rail belonging to the rerouting station.

Both the rectilinear running path sections and the curved running rail sections can be formed by appropriately designed running rail components 60, 62, 64 or 66, which can be fitted to associated load-bearing profiles or other mountings, for example, can be hooked in by means of sections of the running rail components which have hook-like cross sections. Reference is made to FIGS. 3, 4, 5 and 6, the load-bearing profiles carrying the running rail components 60 and 62 not being illustrated in FIG. 5. A curved running rail component 60 or 62, which could be part of the curved section of the running rail path 52 or 56, is shown in FIG. 9.

With regard to the structural stability of the suspended conveyer device, and to satisfactory guidance of the frictional belts of the two conveyer paths, the running rails are designed to be intrinsically continuously rectilinear in the area of the deflection station. Corresponding rectilinear running rail sections 70 and 72 can be seen in FIG. 2. However, curved running rail components together with appropriate load-bearing profiles are integrated into the running rail stream, designed continuously in one piece or many pieces, of the first and second conveyer path, respectively, and are connected to the rectilinear running rail sections in such a way that supports 7 for goods to be conveyed coming from the bottom in FIG. 2 change to the respective curved running rail path section, so that no supports for goods to be conveyed are guided via the running rail paths 70 and 72 which, to a certain extent, bypass the rerouting station 50. The frictional belt 80 serving to convey the supports for goods to be conveyed along the first conveyer path 54, and a corresponding frictional belt serving to convey the supports for goods to be conveyed along the second conveyer path 58 do not, however, follow the curved running rail path sections but run in a frictional belt guide 82 which is snapped into the relevant running rail component (running rail component 66 in FIG. 4) belonging to the "bypass running rail path" 70 or 72.

To convey the supports 7 for goods to be conveyed through the rerouting station 50, use is made of a separate drive arrangement, comprising a driver chain 92 guided as an endless chain and drivable by means of a drive motor 90, and a driver chain 96 guided as an endless chain and drivable by means of a drive motor 94. The two driver chains 92 and 96 are in each case guided in a chain guide 98 and 100, respectively, which can, for example, be integrated into load-bearing profiles holding the running rail components 60, 62 or fitted to said profiles.

The driver chains 92 and 96 each have engagement elements 102 which are fitted to a respective chain segment at defined intervals, engage in the groove 28 (cf. FIG. 1) bounded at the top by the roof-like web 30 (cf. FIG. 1) and carry the relevant support 7 for goods to be conveyed along the running rail path in accordance with the movement of the driver chain 92 or 96. According to the illustration in FIG. 5 and FIG. 6, the engagement elements 102 can be designed with a resilient engagement section, which has been or is clamped in the groove 28 against resilient restoring forces of the respective engagement section and, accordingly, ensures reliable force-fitting coupling of the relevant driver chain, on the one hand, and the relevant support for goods to be conveyed, on the other hand. Instead of a resilient configuration of the engagement elements, thought could also be given to the latter engaging with a form fit in associated recesses in the supports for goods to be conveyed and carrying the latter along with a form fit.

Figure 5:
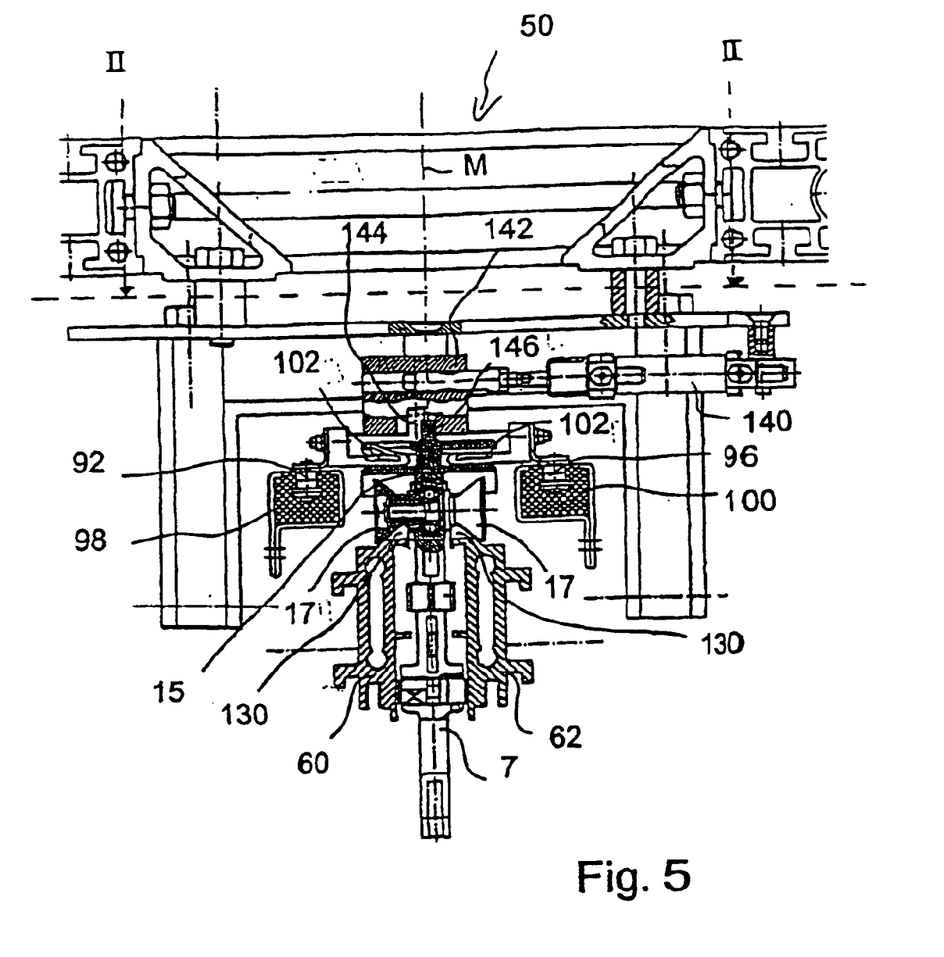
FIG. 5 shows a section through the arrangement of FIG. 2 along line V—V in FIG. 2, FIG. 5 showing a central area of the rerouting station, adjoining the representation of FIG. 3 on the right.
Figure 6:
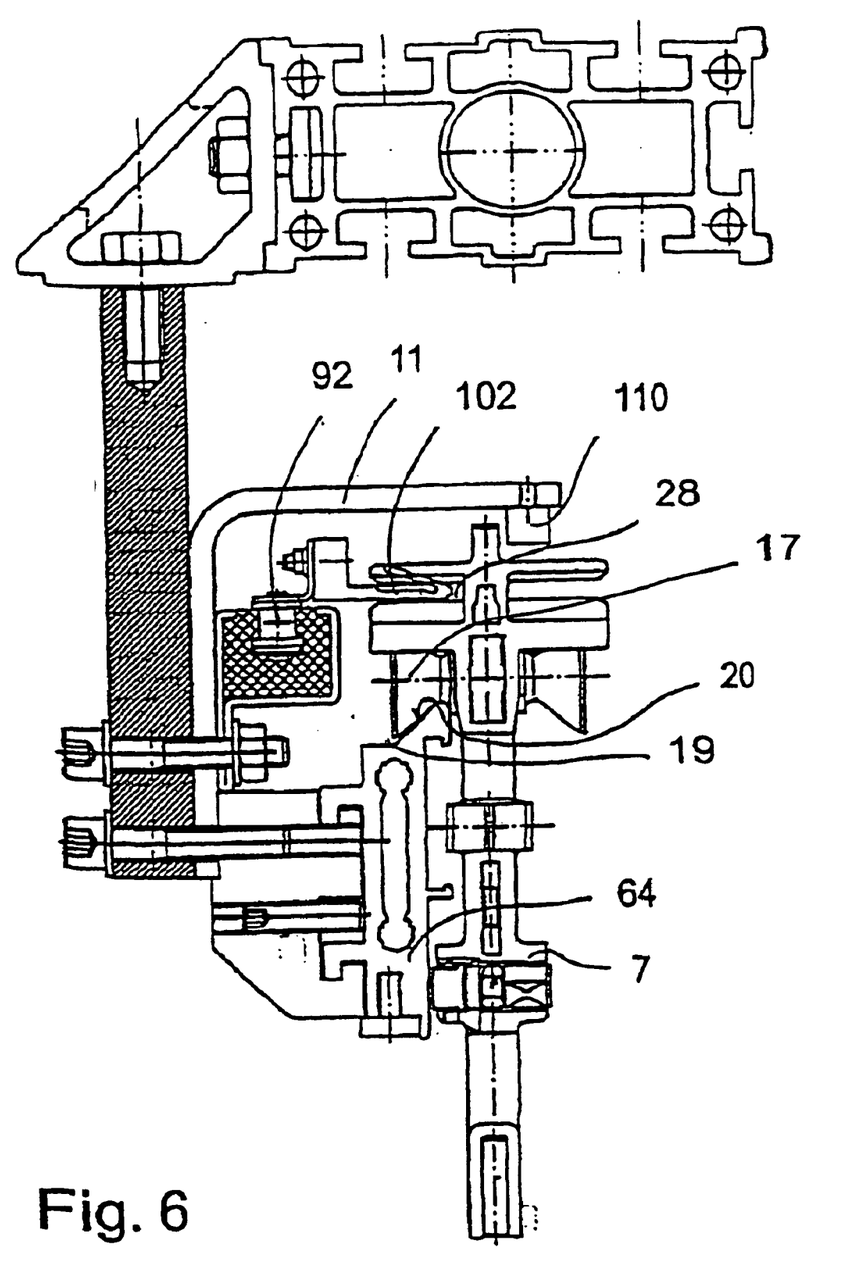
FIG. 6 shows a section through a running rail path of the rerouting station in a conveyer path area, in which a driving engagement is produced between a respective support for goods to be conveyed and a driver chain of the rerouting station.

According to the illustrations in FIGS. 5 and 6, as they are carried along by the relevant driver chain 92 or 96, the supports 7 for goods to be conveyed can be guided on the running rail components (reference symbols 60, 62 in FIG. 5; reference symbol 64 in FIG. 6) in the manner explained above with reference to FIG. 1, namely with rolling engagement of the running roller 17 associated with the running rail path in the guide groove 19 of the running rail path, the conical configuration of the running rollers 17 and the running surface 20 (FIG. 6), which is designed with an inclined cross section and bounds the guide groove 19 ensuring reliable lateral guidance of the supports 7 for goods to be conveyed. In principle, however, it is also possible for the guidance of the supports for goods to be conveyed to be provided merely by the driver chains and their engagement elements 102 and, for example, for the supports for goods to be conveyed to be lifted easily off the relevant running rail component.

The engagement between the engagement elements of the relevant driver chain 92 and 96 and the supports for goods to be conveyed is produced positively by the fact that the supports for goods to be conveyed move into a transfer area of the relevant conveyer path under the driving action of the relevant frictional belt, in that they approach the support 7 for goods to be conveyed laterally from the side of engagement elements 102 approaching the support for goods to be conveyed and engage in the respective groove 28, if necessary with resilient bending of the engagement section. Since, in this area of the conveyer path, forces acting in the lateral direction on the supports for goods to be conveyed occur or can occur, it is expedient to provide a drop-off safeguard that prevents the supports for goods to be conveyed dropping off the respective running rail path, for example in the form of a safety rail 110 (FIG. 6), which runs along the relevant conveyer path and can be held by load-bearing brackets 112 or the like. A corresponding drop-off safeguard is also expedient at least in those areas of the conveyer paths in which centrifugal forces acting on the supports for goods to be conveyed can occur, which could allow the supports for goods to be conveyed to drop off the running rail paths. In FIG. 2, dashed lines mark those running rail path sections in which it would be particularly expedient to take appropriate drop-off safeguard measures to prevent the supports for goods to be conveyed dropping off the relevant running rail.

In the embodiment shown in the figures, in the inlet area of the rerouting station 50, there is provided a passage barrier 120 associated with the first conveyer path and a passage barrier 122 associated with the second conveyer path 58, which is used for the purpose of selectively letting through supports 7 for goods to be conveyed in the direction of the arrow (arrow R) or holding them back counter to the conveying action of the frictional belt, if appropriate whilst backing up a plurality of supports for goods to be conveyed. The passage barriers are constructed in such a way that they can let through individual supports for goods to be conveyed in a defined manner so that separation of any supports for goods to be conveyed that have backed up is possible. Upstream, that is to say upstream of the passage barriers in the conveying direction, in each case a barcode reading arrangement 124 or 126 is provided which, by using barcodes fitted under the frictional surfaces 22, is able to identify the individual supports for goods to be conveyed or the goods conveyed by said supports. The passage barriers 120, 122 can preferably be actuated on the basis of the identifications of the supports for goods to be conveyed obtained by the barcode reading arrangements 124, 126, for example, in order to carry out sorting tasks or the like.

With regard to the functioning and the construction of the rerouting station 50 in detail: the curved running rail path sections are guided in such a way that, in the area of the closest approach of the two running rail paths 52, 56, only one support 7 for goods to be conveyed still passes between the two running rail components 60 and 62, specifically only in such a way that both running rollers 17 come into engagement with the two running rail components 60 and 62 or run above the running rail components in the manner shown in FIG. 5. For this purpose, the running rail components each have a cutout 130 in a rail section 132 which bounds the guide groove 19 toward the support for goods to be conveyed, has the running surface 20 (cf. FIG. 4) and permits lateral relative movement of the support 7 for goods to be conveyed relative to the running rail component of the other conveyer path or relative to the running rail component of the original conveyer path, in order to be able to produce the previously free running roller 17 with the running rail component of this other conveyer path or to be able to selectively release the engagement between the left running roller and the left building rail component or between the right running roller and the right running rail component, so that, following allocation to one of the two conveyer paths, the support 7 for goods to be conveyed is conveyed onward either on the first or on the second conveyer path. As can be seen in FIG. 5, the two conveyer paths within the rerouting station run over a common path section formed by both running rail components 60 and 62, in which the left and the right running roller 17 roll on the respectively associated running rail path or are moved onward above the latter, and in which both driver chains 92 and 96 are engaged via a respective engagement element 102 with a respective support 7 for goods to be conveyed which is located within the common path section. The supports for goods to be conveyed which are supplied to the rerouting station 50 via the two conveyer paths are therefore combined within the rerouting station 50, it making no difference to the support 7 for goods to be conveyed, following the combination, whether it was supplied to the rerouting station via the first conveyer path or via the second conveyer path.

Figure 7:
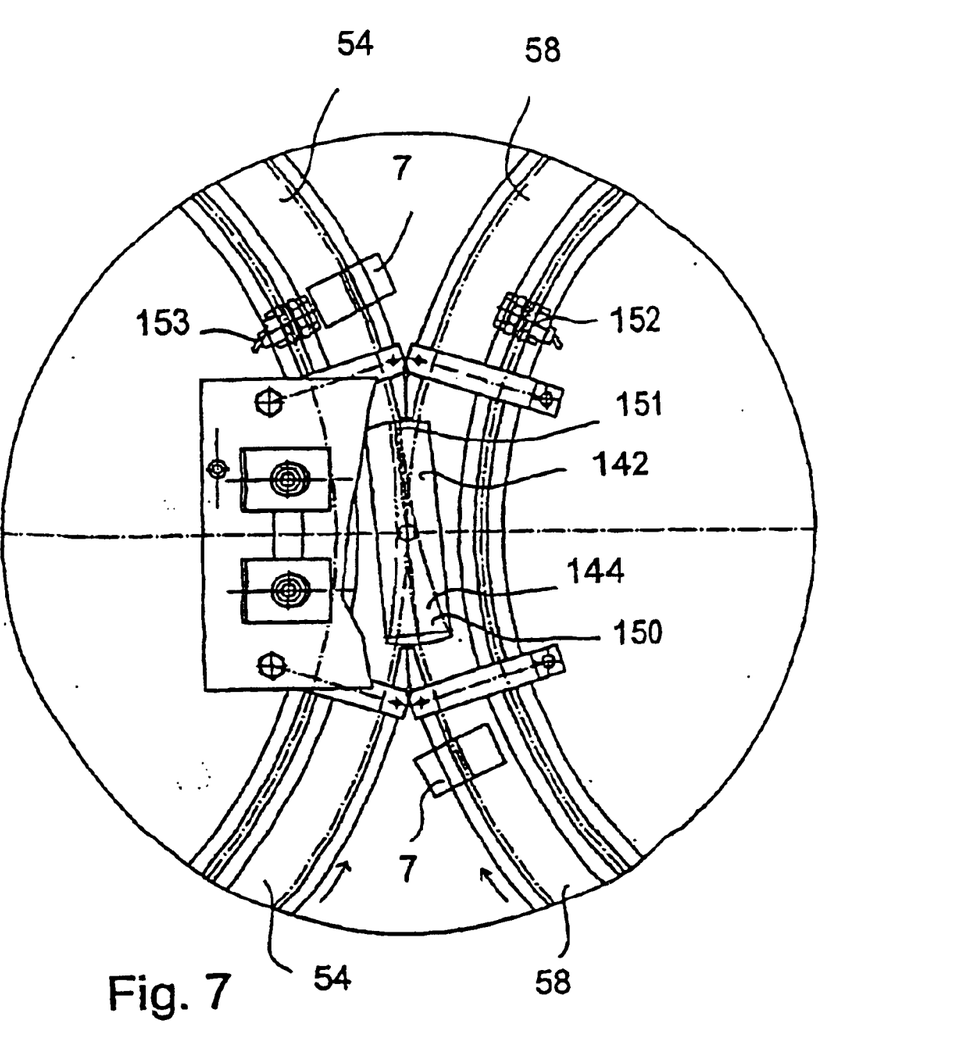
FIGS. 7, 8 show two possible positions of a guide element for supports for goods to be conveyed, belonging to the rerouting station, for allocating the supports for goods to be conveyed either to the first or to the second conveyer path for further conveyance.
Figure 8:
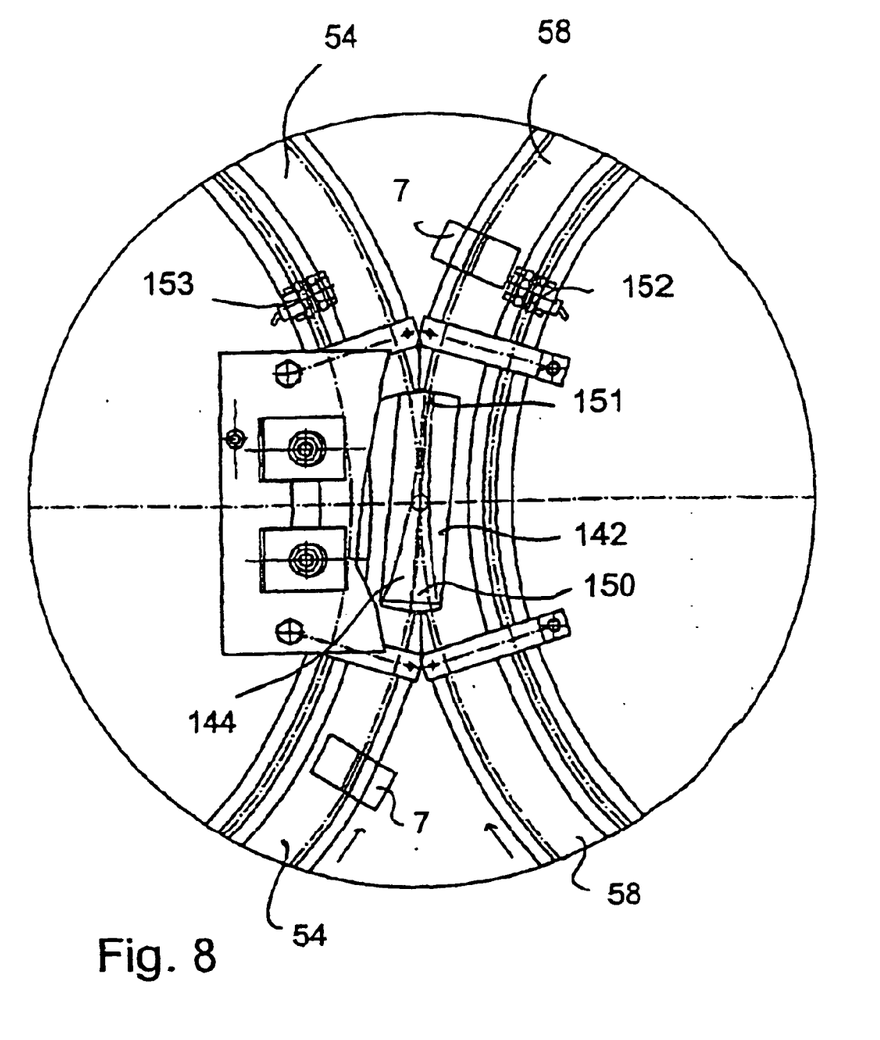

In order to allocate a respective support 7 for goods to be conveyed, moving within the common path section under the action of the driver chains 92, 96, either to the first or to the second conveyer path for further conveyance, a guide element 142 which can be pivoted by means of a pivoting drive 140, for example a double-acting pneumatic cylinder 140, is pivotably mounted above the common path section, said element having a guide channel 144 which is open at the bottom and in and counter to the conveying direction and accommodates a positive guide pin or positive guide web 146 which projects upward from the supporting element 15, slides along on lateral oblique surfaces of the guide element 142, bounding the guide channel 144, and ensures that the support for goods to be conveyed is guided either in accordance with the course of the running rail path 52 or the running rail path 56, so that, after the positive guide web 146 or the positive guide pin 146 has emerged from the guide channel 144, the support for goods to be conveyed is conveyed onward, either along the first conveyer path 54 or along the second conveyer path 58. In this regard, reference is made to FIGS. 7 and 8, which show the guide element 142 in a first guide position (FIG. 7) and in a second guide position (FIG. 8), the supports 7 for goods to be conveyed being assigned to the first conveyer path 54 in the case of the first guide position, and the supports 7 for goods to be conveyed being assigned to the second conveyer path 58 for further conveyance in the case of the second guide position. This applies irrespective of the conveyer path on which the supports 7 for goods to be conveyed are supplied to the guide element 142. This is because the guide channel 144 has a receiving section 150 with a lateral width such that both supports 7 for goods to be conveyed supplied on the first conveyer path 54 and supports for goods to be conveyed supplied on the second conveyer path 58 enter the guide channel 144 in both guide positions. The lateral width of the guide channel 144 decreases continuously and ends in a discharge section 151 which, depending on the guide position, allocates the supports for goods to be conveyed in a defined manner either to the first or to the second conveyer path for further conveyance. The tracks which the positive guide pins or webs 146 follow through the rerouting station 50 are shown dash-dotted in FIG. 7 and FIG. 8. It can be seen that the relevant track of the first and of the second guide path, respectively, runs through the center of the discharge section 151 of the guide element 142 arranged in the appropriate guide position.

In order to provide goods sorting and distribution tasks, the guide element 142 can be actuated by means of the drive 140, preferably on the basis of the identification results of the barcode reading arrangements 124, 126, preferably in synchronism with actuation of the passage barriers 120, 122. The synchronization can be carried out in a straightforward manner on the basis of signals from detectors 152, 153 for supports for goods to be conveyed, said detectors indicating that a support 7 for goods to be conveyed has emerged from the guide channel 144 and has been allocated either to the first or to the second conveyer path for further conveyance.

As can be seen in the figures, the suspended conveyer device used as an example, has various further components, whose purpose and configuration can be seen from the figures by those skilled in the art or are without specific importance for the invention. For example, various load-bearing profiles and other load-bearing elements can be seen, on which the various components of the two conveyer paths and of the rerouting station are suspended.

With reference to FIG. 5, mention should be further made of the fact that the guide element 142 is illustrated partly sectioned, an unsectioned central section of the guide element representing a view of the guide element 142 in the conveying direction, an upper sectioned section representing a section in a section plane in which the pivoting drive 140 acts on the guide element 142, and a lower, sectioned section representing a section plane which corresponds to the section line V—V in FIG. 2 or being located shortly upstream of the latter in the conveying direction. This section plane is also based on the sectioned area of the support 7 for goods to be conveyed in FIG. 5, from which it can be seen that the support 7 for goods to be conveyed is arranged substantially symmetrically with respect to a vertical center line M. Accordingly, the positive guide pin or web 146 rests on a right-hand inclined surface of the guide element 142, bounding the guide channel 144. FIG. 5 further reveals that the guide element 142 is instantaneously arranged in the first guide position, in which it is allocated to the support 7 for goods to be conveyed belonging to the first conveyer path 54.

It is further pointed out that, instead of the chain drive 92, 96 belonging to the rerouting station and driving the supports for goods to be conveyed, said station can also have a different type of drive for the supports for goods to be conveyed, for example comprising at least one frictional belt. Mention should also be made of the fact that the drive can, in principle, act at any desired point on the supports for goods to be conveyed, in order to carry the latter with it.

Completely different designs of the rerouting station are also possible in order to provide the aforementioned functionalities. For example, the rerouting station can be constructed by using branching stations or diverters of the type described in the German application 199 43 141.

What is claimed is:

1. A suspended conveyer device for conveying supports (7) for goods to be conveyed along conveyer paths (54, 58), comprising a running rail arrangement (52, 56) with running rails (52, 56) which are associated with the conveyer paths and on which the supports (7) for goods to be conveyed can be guided, whereby the supports (7) for goods to be conveyed in each case comprise a supporting element (15) having two running rollers (17), projecting from the supporting element on opposite sides, to roll on running rails (52, 56) associated with the conveyer paths (54, 58), whereby in each case at least one running rail (52 or, respectively, 56) is assigned to the conveyer paths and has a running roller guide groove (19) which is open at the top to guide supports for goods to be conveyed which, in each case, as based on the conveying direction, are suspended by a left or right running roller (17) on the running rail, engage with this running roller in the guide groove, and, with the supporting element (15), extend downward into a conveyer path clearance laterally beside the running rail, whereby a rerouting station (50) is provided, which is constructed to selectively reroute supports (7) for goods to be conveyed from a first conveyer path (54) to a second conveyer path (58) or to leave them on the first conveyer path (54), and to selectively reroute supports (7) for goods to be conveyed from the second conveyer path (58) to the first conveyer path (54) or to leave them on the second conveyer path (58), whereby rerouting between the first (54) and the second (58) conveyer path provides for a change from suspension of the supports (7) for goods to be conveyed by the left suspension of the supports (7) for goods to be conveyed by the right running rollers (17) on a relevant running rail or, respectively, a change from suspension of the supports (7) for goods to be conveyed by the right running rollers (17) on a relevant running rail to suspension of the supports (7) for goods to be conveyed by the left running rollers (17) on a relevant running rail, whereby the first conveyer path (54) comprises a first running rail path (60) leading continuously through the rerouting station (50), and the second conveyer path (58) comprises a second running rail path (62) leading continuously through the rerouting station (50), whereby, of the first and the second running rail path, one (60) is a running rail path associated with left running rollers (17) and the other (62) is a running rail path associated with right running rollers (17), characterized in that the first conveyer path (54) and the second conveyer path (58) in the rerouting station (50) run over a decision path which is common to these conveyer paths and is associated with the first and the second running rail path or a decision location which is common to these conveyer paths and is associated with the first and the second running rail path (FIG. 5), in that in the rerouting station (50), in the area of the decision location or within the decision path, the supports for goods to be conveyed are in actual or potential guiding engagement and, possibly, supporting and running-roller rolling engagement both with a first running rail path (60) of the first conveyer path (54) and with a second running rail path (62) of the second conveyer path (58), in that, as they pass the decision path or the decision location, the supports for goods to be conveyed can be selectively allocated to the first (54) or the second (58) conveyer path for the further conveyance, and in that the first running path (52) and the second running rail path (56) run toward each other in a curved shape in the direction of the decision path or the decision location and, in the area of the decision path or the decision location, have a lateral spacing which leaves a common conveyer path clearance free.

2. The suspended conveyer device as claimed in claim 1, characterized in that of the first and the second conveyer path, one (54), at least in some areas but in any case in a path area located upstream of the rerouting station (50) in the conveying direction and in a path area located downstream of the rerouting station (50) in the conveying direction, is provided to guide supports (7) for goods to be conveyed suspended on a relevant running rail by the left running rollers (17), and the other (58), at least in some section but in any case in a path area located upstream of the rerouting station (50) in the conveying direction and in a path area located downstream of the rerouting station (50) in the conveying direction, is provided to guide supports (7) for goods to be conveyed suspended on a relevant running rail by the right running rollers (17).

3. The suspended conveyer device as claimed in claim 1 or 2, characterized in that in the rerouting station (50), in the area of the decision location or within the decision path, in the case of a left running roller (17), between the latter and the associated running rail path (60) there is provided no substantial guiding arrangement or only such engagement which is reduced as compared with other running rail paths, acting laterally to the right, and in the case of a right running roller (17), between the latter and the associated running rail path (62) there is provided no substantial guiding arrangement or only such engagement which is reduced as compared with other running rail paths, acting laterally to the left.

4. The suspended conveyer device as claimed in claim 3, characterized in that a rail section (132) which bounds a guide groove (19) laterally toward the conveyer path clearance and belongs to the first running rail path (52), and a rail section which bounds a guide groove (19) laterally toward the conveyer path clearance and belongs to the second running rail path in each case have a cutout (130) which is open laterally to the left and right, respectively in the area of the decision location or within the decision path.

5. The suspended conveyer device as claimed in one of claims 1 to 4, characterized in that the first (54) and the second (58) conveyer path run parallel to each other in some areas.

6. The suspended conveyer device as claimed in one of claims 1 to 5, characterized in that the rerouting station comprises at least one guide element (142) for supports for goods to be conveyed which can be adjusted between a first (FIG. 7) and a second (FIG. 8) guide position and which, in the first guide position, leaves supports (7) for goods to be conveyed supplied on the first conveyer path (54) on the latter and reroutes supports (7) for goods to be conveyed supplied on the second conveyer path (58) to the first conveyer path (58) and which, in the second guide position, leaves supports (7) for goods to be conveyed supplied on the second conveyer path (58) on the latter and reroutes supports for goods to be conveyed supplied on the first conveyer path (54) to the second conveyer path (58).

7. The suspended conveyer device as claimed in claim 3, characterized in that the first running rail path (52) and the second running rail path (56) run toward each other in a curve in the direction of the decision path or the decision location and, in the area of the decision path or the decision location, have a lateral spacing which leaves a common conveyer path clearance free.

8. The suspended conveyer device as claimed in claim 1, characterized in that the first (54) and the second (58) conveyer path run parallel to each other in some areas.

9. The suspended conveyer device as claimed in claim 1, characterized in that the rerouting station comprises at least one guide element (142) for supports for goads to be conveyed which can be adjusted between a first (FIG. 7) and a second (FIG. 8) guide position and which, in the first guide position, leaves supports (7) for goods to be conveyed supplied on the first conveyer path (54) on the latter and reroutes supports (7) for goods to be conveyed supplied on the second conveyer path (58) to the first conveyer path (58) and which, in the second guide position, leaves supports (7) for goods to be conveyed supplied on the second conveyer path (58) on the latter and reroutes supports for goods to be conveyed supplied on the first conveyer path (54) to the second conveyer path (58).

10. The suspended conveyer device as claimed in claim 3, characterized in that the guide element (142), preferably arranged above the decision location or the decision path, has at least one run-on inclined surface, onto which a respective positive guidance section (146) preferably formed by an upper end section of the supporting element and belonging to the supports (7) for goods to be conveyed runs and which guides the supports for goods to be conveyed positively in such a way that the respective support (7) for goods to be conveyed is conveyed onward along a specific conveyer path downstream of the decision point or the decision path, along the first conveyer path (54) in the case of the first guide position and along the second conveyer path (58) in the case of the second guide position.

11. The suspended conveyer device as claimed in claim 10, characterized in that in the rerouting station (50), the supports (7) for goods to be conveyed are, at least in some areas, in driving engagement both with the first driver element (92) and with the second driver element (96).

12. The suspended conveyer device as claimed in claim 10 or 11, characterized in that a main drive arrangement (80, 82) assigned to the first and the second conveyer path (54, 58), and an additional drive arrangement (90, 92, 94, 96) assigned to the rerouting station are provided, the main drive arrangement (80, 82) comprising at least one elongate first main driver element (80), if appropriate a first frictional belt (80), that drives supports (7) for goods to be conveyed along the first conveyer path (54), and at least one elongate second main driver element, if appropriate a second frictional belt, which drives supports for goods to be conveyed along the second conveyer path (58), and the additional drive arrangement (90, 92, 94, 96) comprising at least one elongate first additional driver element (92), if appropriate a first driver chain (92), which is assigned to the first conveyer path (54) and conveys the supports (7) for goods to be conveyed through the rerouting station (50), and at least one elongate second additional driver element (96), if appropriate a second driver chain (96), which is assigned to the second conveyer path (58) and conveys the supports (7) for goods to be conveyed through the rerouting station (50).

13. The suspended conveyer device as claimed in claim 1, characterized, in that a drive arrangement (90, 92, 94, 96) is provided which comprises at least one elongate first driver element (92), if appropriate a first driver chain (92), which is associated with the first conveyer path (54) and conveys the supports (7) for goods to be conveyed through the rerouting station (50), and at least one elongate second driver element (96), If appropriate a second driver chain (96), which is associated with the second conveyer path (58) and conveys the supports (7) for goods to be conveyed through the rerouting station (50).

14. The suspended conveyer device as claimed in claim 12 or 13, characterized in that the additional driver elements (92, 96) carry engagement elements (102) which, preferably above the running rollers (17), act with a form fit or force fit on the supports (7) for goods to be conveyed in order to produce a form-fitting or force-fitting driving engagement, the engagement elements (102) preferably engaging in engagement cutouts (28) in the supports (7) for goods to be conveyed, producing the driving engagement, wherein, in the case of the force-fitting driving engagement, the latter is preferably based on resilient reaction forces of the engagement elements (102) deformed resiliently in the course of the production of the driving engagement, or is reinforced by the resilient reaction forces.

15. The suspended conveyer device as claimed in claim 13, characterized in that a main drive arrangement (80, 82) assigned to the first and the second conveyer path (54, 58), and an additional drive arrangement (90, 92, 94, 96) assigned to the rerouting station are provided, the main drive arrangement (80, 82) comprising at least one elongate first main driver element (80), if appropriate a first frictional belt (80), that drives supports (7) for goods to be conveyed along the first conveyer path (54), and at least one elongate second main driver element, if appropriate a second frictional belt, which drives supports for goods to be conveyed along the second conveyer path (58), and the additional drive arrangement (90, 92, 94, 96) comprising at least one elongate first additional driver element (92), if appropriate a first driver chain (92), which is assigned to the first conveyer path (54) and conveys the supports (7) for goods to be conveyed through the rerouting station (50), and at least one elongate second additional driver element (96), if appropriate a second driver chain (96), which is assigned to the second conveyer path (58) and conveys the supports (7) for goods to be conveyed through the rerouting station (50).

16. The suspended conveyer device as claimed in one of claims 1 to 15, characterized in that, in an inlet area of the rerouting station (50), there is provided a passage barrier (50) associated with the first conveyer path (54) and/or a passage barrier (122) associated with the second conveyer path (58), for the selective barring and releasing of the passage through the rerouting station (50) for the supports (7) for goods to be conveyed, the passage barrier (122) preferably enabling separation of the supports (7) for goods to be conveyed.

17. The suspended conveyer device as claimed in claim 15, characterized in that the additional driver elements (92, 96) carry engagement elements (102) which, preferably above the running rollers (17), act with a form fit or force fit on the supports (7) for goods to be conveyed in order to produce a form-filling or force-fitting driving engagement, the engagement elements (102) preferably engaging in engagement cutouts (28) in the supports (7) for goods to be conveyed, producing the driving engagement, wherein, in the case of the force-fitting driving engagement, the latter is preferably based on resilient reaction forces of the engagement elements (102) deformed resiliently in the course of the production of the driving engagement, or is reinforced by the resilient reaction forces.

18. The suspended conveyer device as claimed in claim 15, characterized in that the main driver elements (80) are guided past the rerouting station (50), in that, in an inlet area of the rerouting station, a transfer station is provided, in which the driving engagement between the supports (7) for goods to be conveyed and the respective main driver element (80) is canceled and the driving engagement between the supports (7) for goods to be conveyed and the respective additional driver element (92 or 96) is produced and in that, in an outlet area of the rerouting station, a further transfer station is provided, in which the driving engagement between the supports (7) for goods to be conveyed and the respective additional driver element (92 or 96) is canceled and the driving engagement between the supports (7) for goods to be conveyed and the respective main driver element (80) is produced.

19. The suspended conveyer device as claimed in claim 1, characterized in that, in an inlet area of the rerouting station (50), there is provided a passage barrier (50) associated with the first conveyer path (54) and/or a passage barrier (122) associated with the second conveyer path (58), for the selective barring and releasing of the passage through the rerouting station (50) for the supports (7) for goods to be conveyed, the passage barrier (122) preferably enabling separation of the supports (7) for goods to be conveyed.

20. The suspended conveyer device as claimed in claim 1, characterized in that, in an inlet area or in the inlet area of the rerouting station (50), there is provided an identification arrangement (124) for supports for goods to be conveyed, associated with the first conveyer path (54), if appropriate a barcode reading arrangement (124), and/or an identification arrangement (126) for supports for goods to be conveyed, associated with the second conveyer path (58), if appropriate a barcode reading arrangement (126).

21. A rerouting station for a suspended conveyer device as claimed in one of the preceding claims, the rerouting station (50) being designed to selectively reroute supports (7) for goods to be conveyed from a first conveyer path (54) to a second conveyer path (58) or leave them on the first conveyer path (54), and to selectively reroute supports (7) for goods to be conveyed from the second conveyer path (58) to the first conveyer path (54) or to leave them on the second conveyer path (58), and the rerouting station (50) comprising a first running rail path (60) associated with the first conveyer path (54) and running continuously through the rerouting station (50), and a second running rail path (62) that is associated with the second conveyer path (58) and runs continuously through the rerouting station (50), whereby, of the first and the second running rail path, one (60) is a running rail path associated with left running rollers (17) and the other (62) is a running rail path associated with right running rollers (17), characterized in that the first conveyer path (54) and the second conveyer path (58) in the rerouting station (50) run over a decision path which is common to these conveyer paths and is associated with the first and the second running rail path or a decision location which is common to these conveyer paths and is associated with the first and the second running rail path (FIG. 5), in that in the rerouting station (50), in the area of the decision location or within the decision path, the supports for goods to be conveyed are in actual or potential guiding engagement and, if appropriate, supporting and running-roller rolling engagement both with a first running rail path (60) of the first conveyer path (54) and with a second running rail path (62) of the second conveyer path (58), in that as they pass the decision path or the decision location, the supports for goods to be conveyed can be selectively allocated to the first (54) or the second (58) conveyer path for further conveyance, and in that the first running rail path (52) and the second running rail path (56) run toward each other in a curved shape in the direction of the decision path or the decision location and, in the area of the decision path or the decision location, have a lateral spacing which leaves a common conveyer path clearance free.

22. The suspended conveyer device as claimed in claim 1, characterized by at least one drop-off safeguard (110) in the area of the rerouting station (50) against the supports (7) for goods to be conveyed dropping off a relevant running rail path (52 or 56), for example under the action of centrifugal forces and/or in the course of the release and/or production of a driving engagement with an associated driver element (92 or 96 or 80).

23. A method of combining and, if appropriate, mixing at least two streams of goods by using a suspended conveyer device as claimed in one of claims 1 to 20, in which a first stream of goods is supplied to the rerouting station (50) on a first conveyer path (54), and a second stream of goods is supplied to the rerouting station (50) on a second conveyer path (58), the streams of goods are combined, and, if appropriate, mixed in the rerouting station (50), and the resultant stream of goods is carried away from the rerouting station (50) on the first (54) or the second (58) conveyer path.

24. A rerouting station for a suspended conveyer device as claimed in claim 1, the rerouting station (50) being designed to selectively reroute supports (7) for goods to be conveyed from a first conveyer path (54) to a second conveyer path (58) or leave them on the first conveyer path (54), and to selectively reroute supports (7) for goods to be conveyed from the second conveyer path (58) to the first conveyer path (54) or to leave them on the second conveyer path (58).

25. The method as claimed in claim 24, characterized in that the goods from at least two streams of goods are distributed to at least two resultant streams of goods, a first stream of goods being supplied to the rerouting station (50) on the first conveyer path (54), and a second stream of goods being supplied to the rerouting station (50) on the second conveyer path (58).

* * * * *